(12) United States Patent
Shanmugam et al.

(10) Patent No.: US 8,777,316 B2
(45) Date of Patent: Jul. 15, 2014

(54) RECLINER MECHANISM

(75) Inventors: Tamizharasan Shanmugam, Plymouth, MI (US); Kurt Siebold, South Lyon, MI (US); Paul Arthur Gilmore, Livonia, MI (US); David D. Sheill, White Lake, MI (US); Bruce A. Hiemstra, Ann Arbor, MI (US)

(73) Assignee: Johnson Controls Technology Company, Holland, MI (US)

( * ) Notice: Subject to any disclaimer, the term of this patent is extended or adjusted under 35 U.S.C. 154(b) by 1342 days.

(21) Appl. No.: 12/376,097

(22) PCT Filed: Aug. 2, 2007
(Under 37 CFR 1.47)

(86) PCT No.: PCT/US2007/017257
§ 371 (c)(1),
(2), (4) Date: Apr. 27, 2010

(87) PCT Pub. No.: WO2008/019033
PCT Pub. Date: Feb. 14, 2008

(65) Prior Publication Data
US 2010/0283301 A1    Nov. 11, 2010

Related U.S. Application Data

(60) Provisional application No. 60/835,282, filed on Aug. 3, 2006.

(51) Int. Cl.
*B60N 2/02*    (2006.01)
(52) U.S. Cl.
USPC .................. 297/378.14; 297/378.12; 297/341

(58) Field of Classification Search
USPC ................................ 297/341, 378.14, 378.12
See application file for complete search history.

(56) References Cited

U.S. PATENT DOCUMENTS

| 3,957,312 | A | * | 5/1976 | Bonnaud | 297/341 |
| 3,973,799 | A | * | 8/1976 | Berg | 297/341 |
| 5,265,937 | A | * | 11/1993 | Allen | 297/378.11 |
| 6,152,533 | A | * | 11/2000 | Smuk | 297/341 |

(Continued)

FOREIGN PATENT DOCUMENTS

| DE | 10339788 A1 | 3/2004 |
| DE | 102004030320 A1 | 2/2006 |

(Continued)

OTHER PUBLICATIONS

International Search Report mailed Jan. 7, 2008 in International Application No. PCT/US2007/017257.

(Continued)

*Primary Examiner* — David E Allred
(74) *Attorney, Agent, or Firm* — Foley & Lardner LLP

(57) ABSTRACT

A vehicle seat is movable between a first position and a second position and includes a seat back and seat cushion for coupling to a track adjuster for use in a vehicle. The vehicle seat includes a recliner mechanism coupled to the seat back and the seat cushion. The vehicle seat further includes a stow mechanism coupled to the recliner mechanism and an easy entry mechanism coupled to the recliner mechanism and stow mechanism, wherein, when the stow mechanism is actuated, the easy entry mechanism is not actuated and when the easy entry mechanism is actuated, the stow mechanism is not actuated.

10 Claims, 17 Drawing Sheets

(56) References Cited

U.S. PATENT DOCUMENTS

| | | | |
|---|---|---|---|
| 6,336,679 B1 | 1/2002 | Smuk | |
| 6,739,668 B2* | 5/2004 | Coman et al. | 297/378.12 |
| 6,827,404 B2* | 12/2004 | Blair et al. | 297/378.12 |
| 7,040,684 B2* | 5/2006 | Tame et al. | 296/65.09 |
| 7,152,923 B2* | 12/2006 | Charras et al. | 297/378.12 |
| 7,922,251 B2* | 4/2011 | Hayakawa et al. | 297/378.1 |
| 2003/0122412 A1* | 7/2003 | Niimi et al. | 297/341 |
| 2004/0070250 A1* | 4/2004 | Cooley et al. | 297/344.1 |
| 2004/0075323 A1* | 4/2004 | Blair et al. | 297/331 |
| 2010/0176641 A1* | 7/2010 | Hayakawa et al. | 297/378.12 |
| 2012/0119548 A1* | 5/2012 | Abraham et al. | 297/217.1 |
| 2012/0228913 A1* | 9/2012 | Hurst et al. | 297/354.12 |

FOREIGN PATENT DOCUMENTS

| | | | | |
|---|---|---|---|---|
| DE | 102004042038 | * | 3/2006 | B60N 2/20 |
| DE | 102004051873 | * | 4/2006 | B60N 2/08 |
| JP | 2002-501852 A | | 1/2002 | |
| WO | WO-99/38723 A1 | | 8/1999 | |

OTHER PUBLICATIONS

English language translation of Office Action received in Korean Application No. 10-2009-7004401, Nov. 30, 2013.

* cited by examiner

RECLINER MECHANISM

CROSS-REFERENCE TO RELATED PATENT APPLICATIONS

This application claims benefit of and priority to U.S. Provisional Application 60/835,282, filed Aug. 3, 2006, incorporated by reference herein.

BACKGROUND

It is generally known to provide a vehicle seat, for example, an automotive seat having a reclineable back. It is also known to provide a vehicle seat having a reclineable back and an independently movable seat base. It is also known to provide a vehicle seat having an adjustable lumbar consisting of a flexible member having a first end anchored and a second end moved with respect to the first end to cause the flexible member to vary its shape to provide adjustable support within the lumbar region of an automotive seat.

It is common to have a strap in the rearward direction of the seat, typically on the free pivot of the seat. Such configuration is particularly provided on second and third row seats in a sport utility vehicle and vans. The strap is typically positioned for use once the seatback is moved to a point of rearward most travel.

A vehicle seat typically is provided with a seat recliner mechanism operative to adjust the seat at different positions. Locking mechanisms are typically provided and operative for different seat positions. For example, when a second row seat is in an easy entry position, a stow mechanism for the seat should not be operative. Likewise, when a second row seat is in a stow position, a track release mechanism and easy entry mechanism should not be operative.

Thus there is a need for a single recliner mechanism when moved from a design position to selectively actuate a seat easy entry mechanism on a seat stow mechanism. There is a further need for a single recliner mechanism that will interlock to allow selected seat operation, such as a stow flat position.

It is desirable to provide a vehicle seat that provides one or more of these or other advantageous features. Other features and advantages will be made apparent from the present description.

SUMMARY

There is provided a vehicle seat including a seat back and a seat cushion for coupling to a track in a vehicle. The vehicle seat comprises a recliner mechanism coupled to the seat back and the seat cushion for adjusting the position of the seat back with respect to the seat cushion. A stow mechanism is coupled to the recliner mechanism for actuating the recliner mechanism to locate the vehicle seat in a stow position. An easy entry mechanism is coupled to the recliner mechanism and to the stow mechanism, wherein, when the stow mechanism is actuated, the easy entry mechanism is not actuated. Further wherein when the easy entry mechanism is actuated, the stow mechanism is not actuated.

There is also provided a control apparatus for controlling a recliner mechanism in a vehicle seat. The vehicle seat includes a seat back and a seat base to be coupled to a track assembly. The control apparatus comprises a lower bracket coupled to the seat base, an upper bracket coupled to the seat back wherein the recliner mechanism is coupled to the upper and lower brackets and configured to facilitate movement of the seat back. A latch plate member includes a stop protrusion and is slidingly coupled to the recliner mechanism and configured to selectively engage a pawl member. The pawl member includes a pawl pin for cooperative interaction with the latch plate member. An easy entry actuator is rotatably coupled to the recliner mechanism and configured to selectively engage the pawl pin, wherein the latch plate member is prevented from movement wherein the seat cannot move into a stow position. A latch plate cable is coupled at one end to the latch plate member. A pin stow lock is coupled to the lower bracket and configured to contact the latch plate member to allow the seat to move into an easy entry position wherein the position of the latch plate member in relation to the recliner mechanism determines one of the stow and the easy entry seat back position.

There is further provided a method of making a vehicle seat, wherein the vehicle seat includes a seat back and a seat base. The method comprises coupling a recliner mechanism to the seat back and seat base. Coupling an easy entry mechanism to the seat base and coupling a controller mechanism to the recliner mechanism and easy entry mechanism. The controller mechanism includes a latch plate and pawl for selectively operating the recliner mechanism wherein the seat back can be moved about the recliner mechanism to a stow position when the easy entry mechanism is locked by the controller mechanism.

BRIEF DESCRIPTION OF THE DRAWINGS

FIG. 7 is a flowchart describing a method of operating an easy entry mechanism to move the seat of FIG. 1 into an easy entry position according to an exemplary embodiment.

DESCRIPTION

Before beginning the detailed description of an exemplary embodiment, several general comments are warranted about the applicability and the scope of the present invention.

First, the illustrations relate to a seat (also can be referred to as a chair) particularly adapted for motor vehicles, such as cars, SUVs, vans, trucks, buses and the like, but the invention is applicable also to seating used in aircraft, railroad vehicles, nautical vehicles or other environments.

Figure 1:
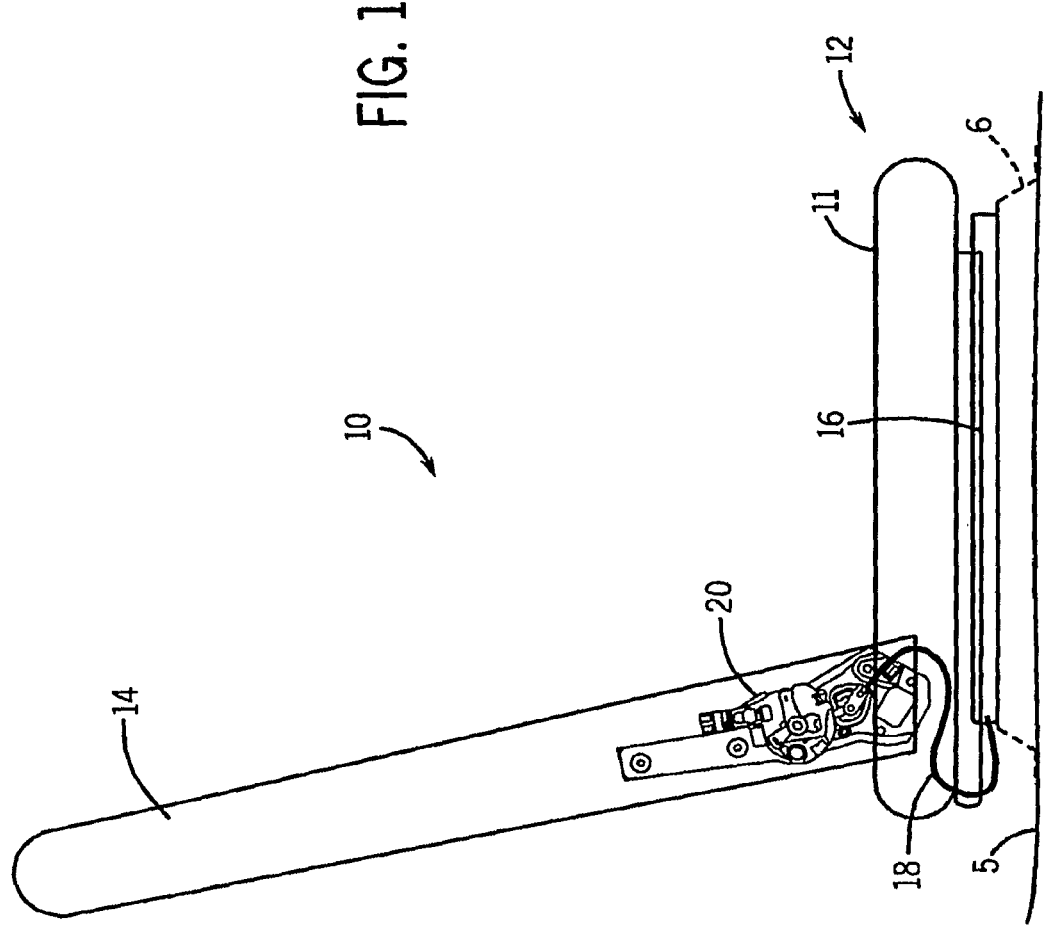
FIG. 1 is a side view of an exemplary embodiment of a seat capable of moving between a design position, an easy entry position, and a stow position using a change of position mechanism according to an exemplary embodiment.

Second, the seat is illustrated in FIG. 1 as a padded seat having certain contours, trim and the like. While this configuration is presently preferred, a wide variety of seat configurations and appearances will benefit from use of the mechanical support and movement mechanisms. Also the exterior of the seat can be covered by fabric, vinyl, leather or other materials known and used in the seating art.

Third, with regard to the seat described later herein, substantial modifications can be made without departing from the intended scope of protection. For example, while certain mechanical systems are described to move seat components to achieve certain results, other mechanisms, manual or powered could be substituted therefore. For example, where a screw drive is used in moving the thorax pivot location, other mechanical equivalents including, but not limited to, four bar linkages, air or hydraulic cylinders, air bladders, rack and pinion systems, cams and cables, gears, etc. could be employed. Another example is that for a pelvis support, i.e., a pair of clam-shell like devices (which are themselves already known in the art). They could be replaced by other known or subsequently developed support mechanisms. These mechanisms do not, in and of themselves, form part of the present invention, but when combined with the other pivot, support, rotation and moving mechanisms define the invention and result in more comfortable seating for the occupant.

Referring generally to the Figures and in particular to FIG. 1 there is shown a vehicle seat 10 for use in a vehicle 5 of any known type. The vehicle seat 10 includes a seat base 12 which supports a cushioned seat 11 and a seat back 14 pivotally connected to the seat base 12. The seat 10 can be either a manually adjustable seat or may be provided with electric motors to provide automated adjustment and electronic control of the seat. Such manipulation can be accomplished by the use of a change of position mechanism or apparatus 20 coupled to seat back 14 and seat base 12. Change of position mechanism 20 provides for the back frame to move in proportional relation to the seat base 12 at a predetermined ratio, for example, moving cushioned seat 11 one and a half millimeter per degree of seat back 14 movement. Seat 10 is connected to the floor of the support structure 6 of a vehicle 5 in any of a variety of configurations or designs which allow for the movement and adjustment of seat 10 within vehicle 5 on a track 16. Movement on track 16 is preferably actuated by force exerted by a track release cable 18. The seat base 12 may also be moved by an actuator, for example, an electric motor, conveniently controlled from the seat or a remote location. Track release cable 18 may be preferably pulled by change of position mechanism 20 or manually by an occupant of seat 10. Vehicle seat 10 may optionally include a headrest which may also be adjustable with respect to an occupant of seat 10 such as any known or appropriate headrest. Change of position mechanism 20 preferably includes a recliner mechanism that allows seat back 14 to recline into a position further back than the design position.

Seat back 14 of vehicle seat 10 preferably includes a central portion cushion and a pair of side bolsters positioned on the sides of the cushion. The cushion is preferably contoured to receive and support the back of an occupant of the vehicle seat 10. The side bolsters are also preferably aligned with respect to the cushion and contoured to provide an angled, gradual support of the lateral side portions of an occupant of the vehicle seat 10. The cushion and side bolsters preferably include a foam material (not shown) and a cover of any appropriate or known material such as cloth, vinyl, leather, etc. The cushion and bolsters typically include support frames.

The seat back 14 further includes a back frame including a cover of any appropriate or known material such as cloth, vinyl, leather, etc. and which preferably matches the cover material of the seat cushion 11, back cushion, side bolsters and seat base 12. However, it should be understood that a different material may be used on any element.

Figure 2:
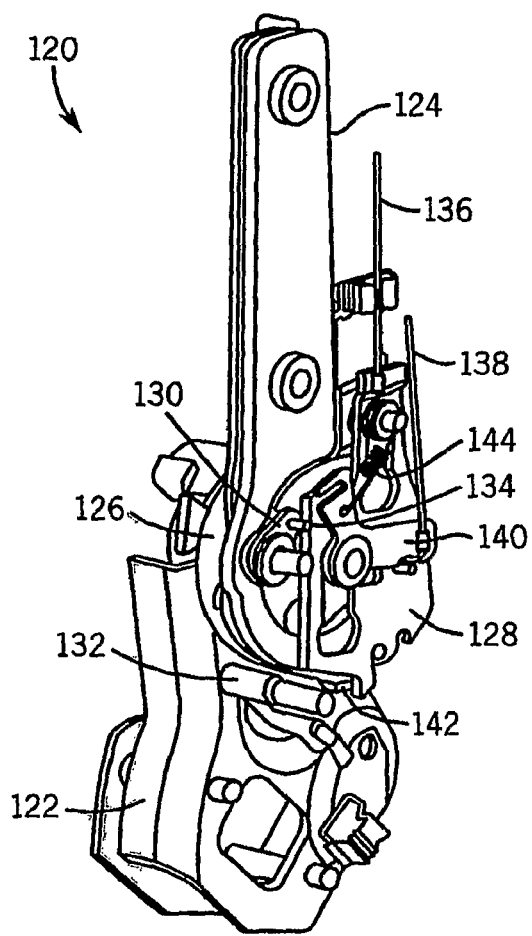
FIG. 2 is a rear perspective view of the change of position mechanism of FIG. 1 according to a first exemplary embodiment.
Figure 3:
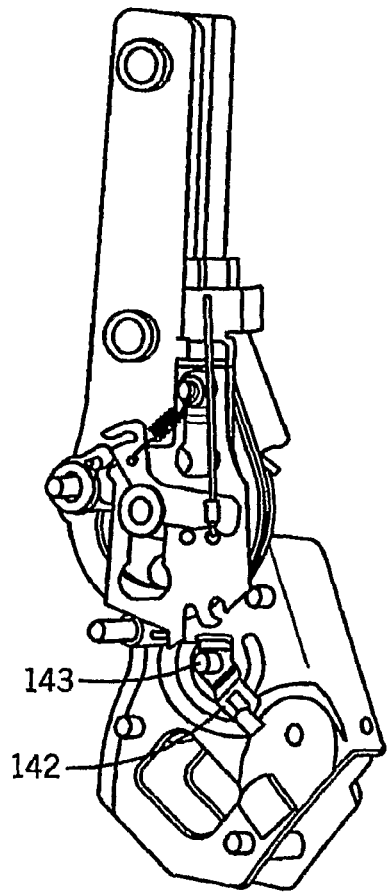
FIG. 3 is a front perspective view of the change of position mechanism of FIG. 1 according to the first exemplary embodiment.

Referring to FIGS. 2 and 3, detailed first and second perspectives of a change of position mechanism 120 according to a first exemplary embodiment are shown. It is noted that while each of the parts are briefly described below, detailed description of their function follows with reference to FIG. 4-9. Change of position mechanism 120 includes a lower bracket 122, an upper bracket 124, a recliner mechanism 126, a latch plate member 128 which includes a stop protrusion proximate the lower portion of the latch plate member, a pawl or cam 130, a pin stow lock or stop pin 132, a pawl pin 134, a latch plate cable 136, an easy entry cable 138, a hand lever 140, a track release lever 142, and a pivot pin 143.

Lower bracket 122 is typically coupled to seat base 12 using pins or bolts for support of change of position mechanism 120 and seat back 14. Upper bracket 124 is typically coupled to seat back 14 using pins or bolts so that it may support seat back 14 and the weight of a seat occupant. Recliner mechanism 126 is preferably welded to lower bracket 122 on one side and upper bracket 124 on the other side and rotates to facilitates the movement of seat back 14. Second and third apparatuses, including latch plate 128, pawl 130, pin stow lock 132, and pawl pin 134 work with recliner mechanism 126 as described hereafter, to facilitate moving seat 10 into alternate positions and locking seat 10 in those positions for increased safety.

When an occupant of seat 10 pulls latch plate cable 136 upwards while change of position mechanism 120 is in a design position, recliner mechanism 126 is unlocked and change of position mechanism 120 is able to move into a stow position. The stow position typically allows for an increase in cargo space. When an occupant of seat 10 pulls easy entry cable 138 upwards when change of position mechanism 120 is in a design position, recliner mechanism 126 is unlocked and change of position mechanism 120 is able to move into an easy entry position. When in this position, latch plate 128 presses against track release lever 142 allowing movement of seat 10 along track 16. The movement of seat back 14 and seat 10 along track 16 in the easy entry position typically allows for easier access to the area behind seat 10, for example for additional cargo space or easier access to additional seating. It is noted that in other exemplary embodiments, each portion of change of position mechanism 120 may be coupled to each other, as appropriate, by any means such as welding or by one or more fasteners, for example bolts, pins, or screws.

Figure 4:
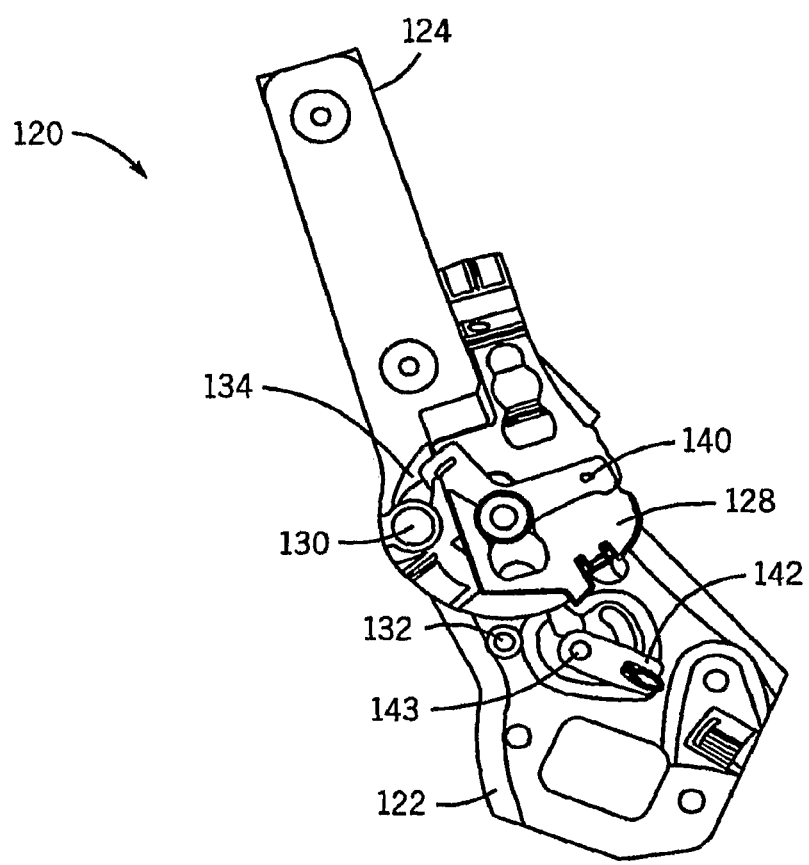
FIG. 4 is a side view of the change of position mechanism of FIG. 1 in a design position according to the first exemplary embodiment.
Figure 5:
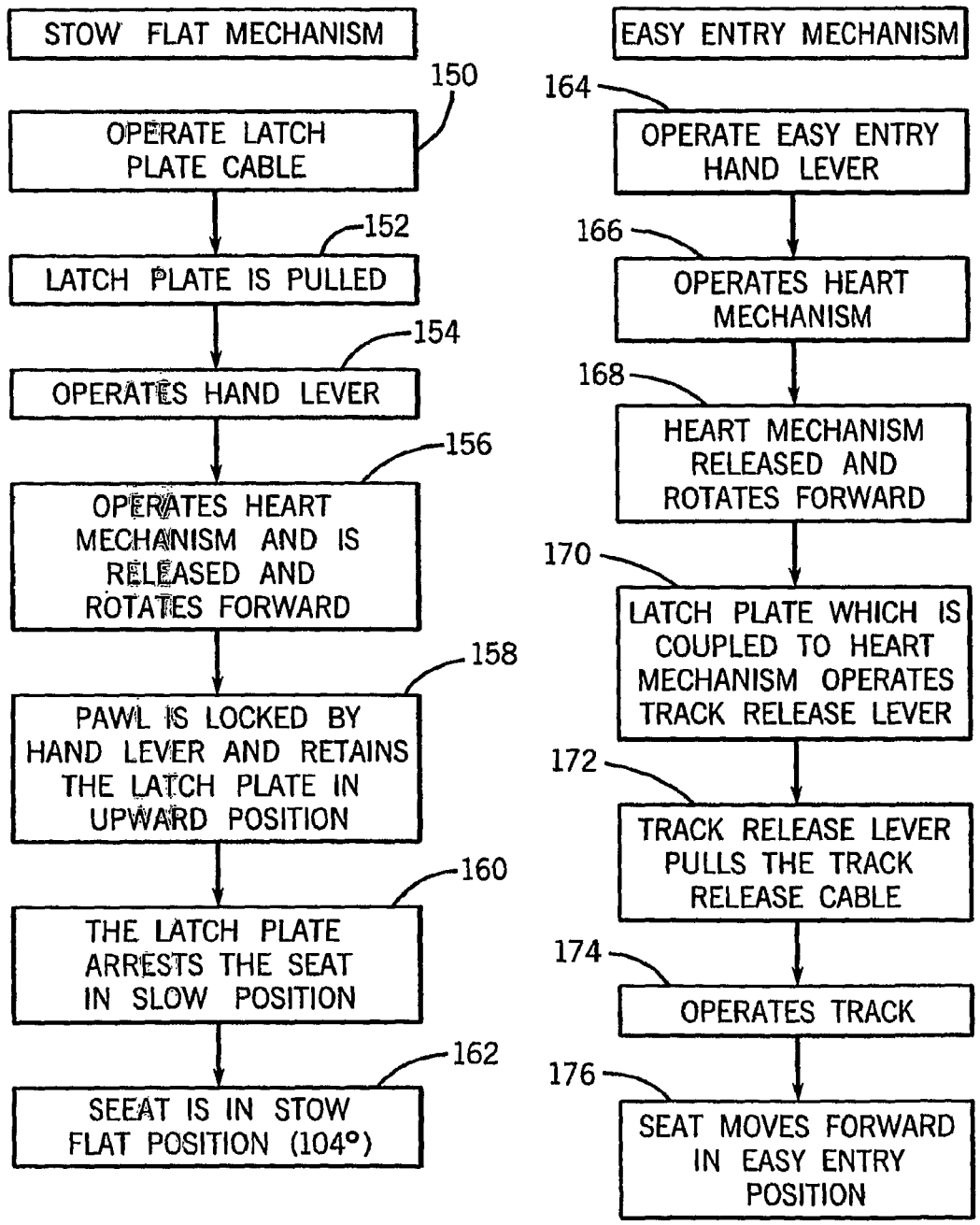
FIG. 5 is a flowchart describing a method of operating a stow mechanism to move the seat of FIG. 1 into a stow position according to an exemplary embodiment.
Figure 6:
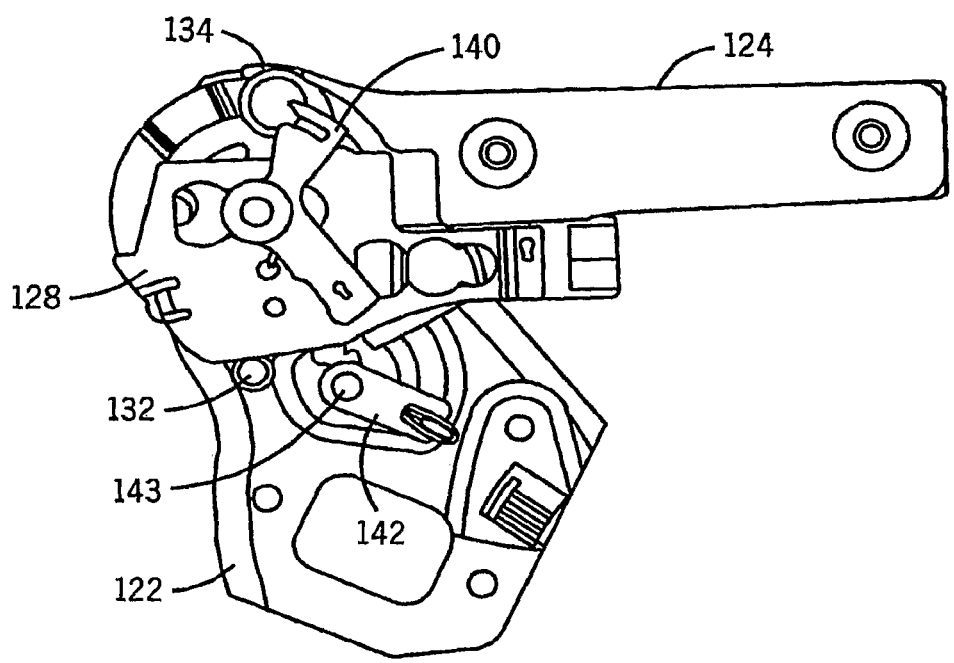
FIG. 6 is a side view of the change of position mechanism of FIG. 1 in a stow position according to the first exemplary embodiment.

Referring also to FIG. 4-6, the movement of change of position mechanism 120 from a design position to a stow position using a stow mechanism is discussed. The stow mechanism is the collection of parts of change in position mechanism 120 that is used to set seat 10 into the stow position.

At step 150 an occupant pulls latch plate cable 136. It is noted that in various exemplary embodiments, the occupant may manually pull latch plate cable 136 or another coupled part (for example a lever) or may press a button coupled to an actuator, for example, an electric device, that causes latch plate cable 136 to be pulled.

At step 152, the force exerted on latch plate 128 by latch plate cable 136 causes latch plate 128 to be pulled.

At step 154, a spring 144 is extended when latch plate 128 is pulled, which causes operation or pulling forward of hand lever 140.

At step 156, when hand lever 140 is operated, recliner mechanism 126 is released. The recliner is now free to go in stow position and recliner mechanism 126 rotates in a forward direction.

At step 158, as the stow angle decreases with the rotation of recliner mechanism 126, latch plate 128 contacts pin stow lock 132 and pawl pin 134 moves latch plate 128 further upwards. As seat 10 stows further, latch plate 128 comes back to the same position as when seat 10 was in the design position, due to the bias of spring 144. Pawl 134 keeps latch plate 128 in the pulled or upwards position so seat 10 does not go into the easy entry position. Pawl 134 is locked in its position by hand lever 140.

At step 160, with seat 10 in the stow position, latch plate 128 slides over pin stow lock 132 a predetermined distance. Thus, latch plate 128 is arrested in this position and arrests seat back 14 in the stow position. The resting of latch plate 128 on pin stow lock 132 and of seat back 14 on cushioned seat 11, prevents further downward motion of seat back 14.

At step 162, the stow flat mechanism has completed its function and seat 10 is arrested in the stow position, preferably at 104 degrees from the design position. In other exemplary embodiments, the stow position may arrest seat 10 at an angle of greater than or less than 104 degrees from the design position as long as the position allows for increased cargo space.

Seat 10 may be placed back to the design position by pulling on latch plate cable 136 and rotating seat back 14 in a backwards direction. When change of position mechanism 120 reaches the design position, hand lever 140 returns back to the design position as well. This results in the release of pawl 130, which in turn allows latch plate 128 to go down to the design position.

Figure 8:
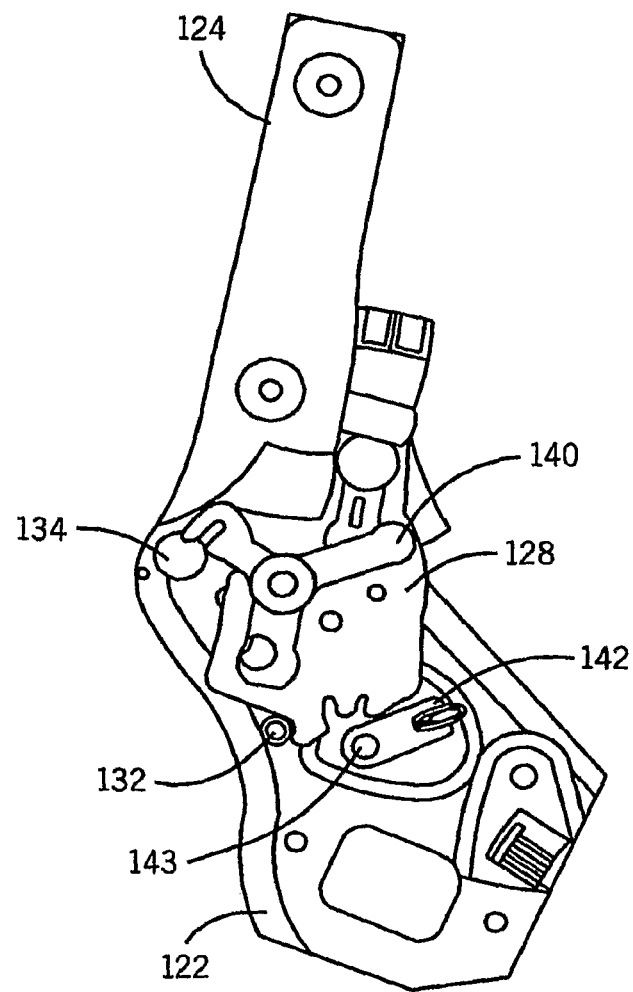
FIG. 8 is a side view of the change of position mechanism of FIG. 1 in an easy entry position according to the first exemplary embodiment.

Referring now to FIGS. 7 and 8, the movement of change of position mechanism 120 from a design position to an easy entry position using an easy entry mechanism is discussed. The easy entry mechanism is the collection of parts of change in position mechanism 120 that is used to set seat 10 into the easy entry position.

At step 164, an occupant pulls easy entry cable 138. It is noted that in various exemplary embodiments, the occupant may manually pull easy entry cable 138 or another coupled part (for example a lever) or may press a button coupled to an actuator, for example, an electric device, that causes easy entry cable 138 to be pulled.

At step 166, the force exerted by a pulled easy entry cable 138 pulls hand lever 140 in an upward direction. Hand lever 140 comes to rest on pawl pin 134 to prevent latch plate 128 from being pulled up by latch plate cable 136 and seat 10 moving into a stow position.

At step 168, recliner mechanism 126 is released and rotates in a forward direction, also moving seat back 14 forward.

At step 170, when seat back 14 is actuated to the easy entry position, latch plate 128, which is coupled to recliner mechanism and rotates with it, presses against and operates track release lever 142.

At step 172, track release lever 142 rotates on a pivot pin 143 and pulls a track release cable, unlocking seat 10 from its position on track 16.

At step 174, seat 10 operates on track 16 allowing for movement in a forward direction.

At step 176, seat 10 is moved forward on track 16 enabling the occupant to enter another row of seating in vehicle 5.

Seat 10 may be placed back to the design position by rotating seat back 14 in a backwards direction. When change of position mechanism 120 reaches the design position, hand lever 140 returns back to the design position as well.

Figure 9:
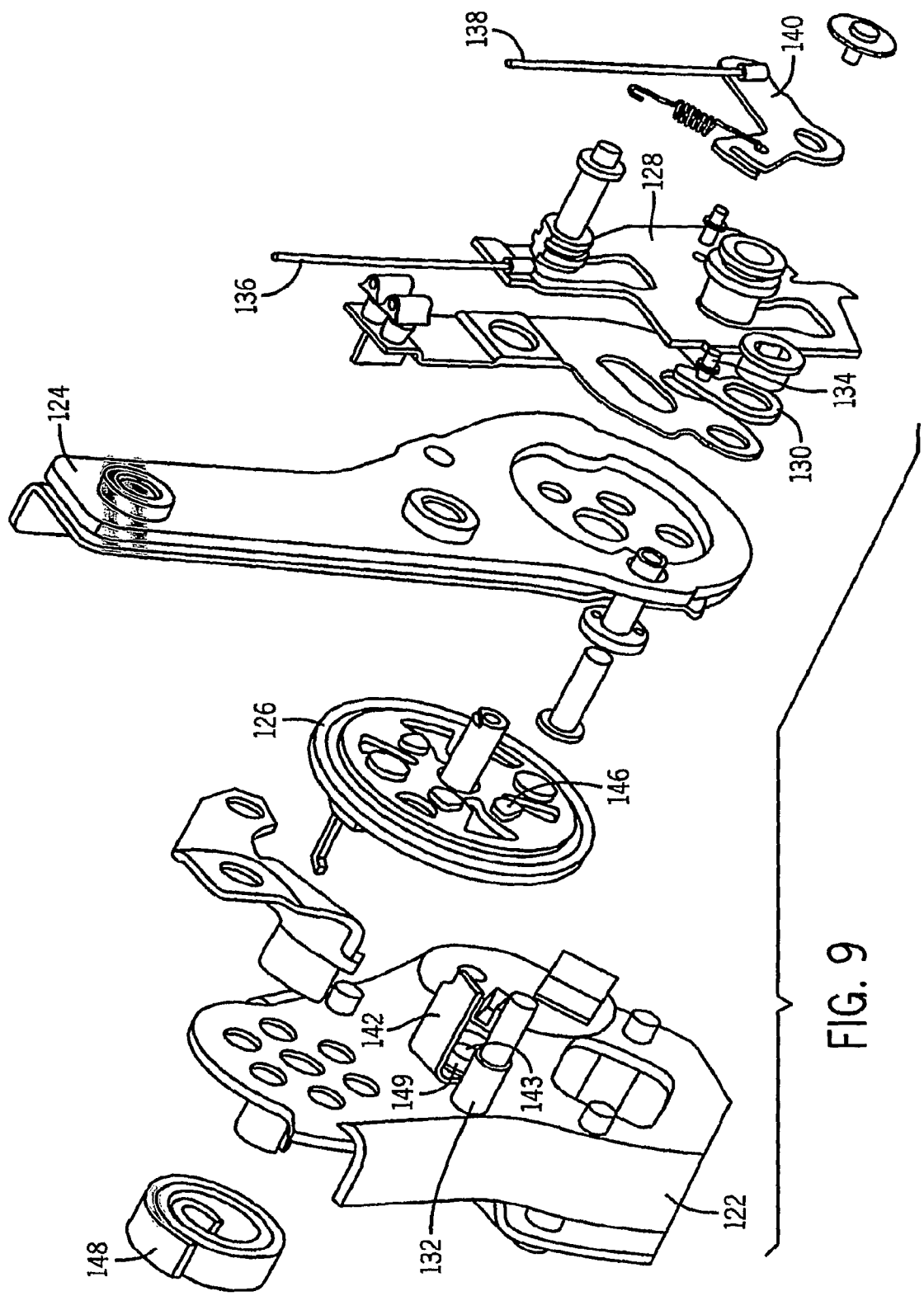
FIG. 9 is an exploded view of the change of position mechanism of FIG. 1 in according to the first exemplary embodiment.

Referring to FIG. 9, greater detail of the parts of change of position mechanism 120 is shown. Recliner mechanism 126 includes protrusions 146 configured to mate with upper bracket 124 so that the two pieces move together. Recliner mechanism 126 is also configured to couple to a spring 148 that biases seat back 14 forward when latch plate cable 136 or easy entry cable 138 are pulled unlocking recliner mechanism 126. Pivot pin 143 includes a spring 149 that biases track release lever 142 back to its original position when a force is not exerted on it.

Referring to FIG. 10-13, the movement of a change of position mechanism 220 between design, easy entry, partial stow, and stow positions according to a second exemplary embodiment is shown. The function of the second exemplary embodiment is similar to that of the first exemplary embodiment, with different parts to accomplish these functions.

Figure 10:
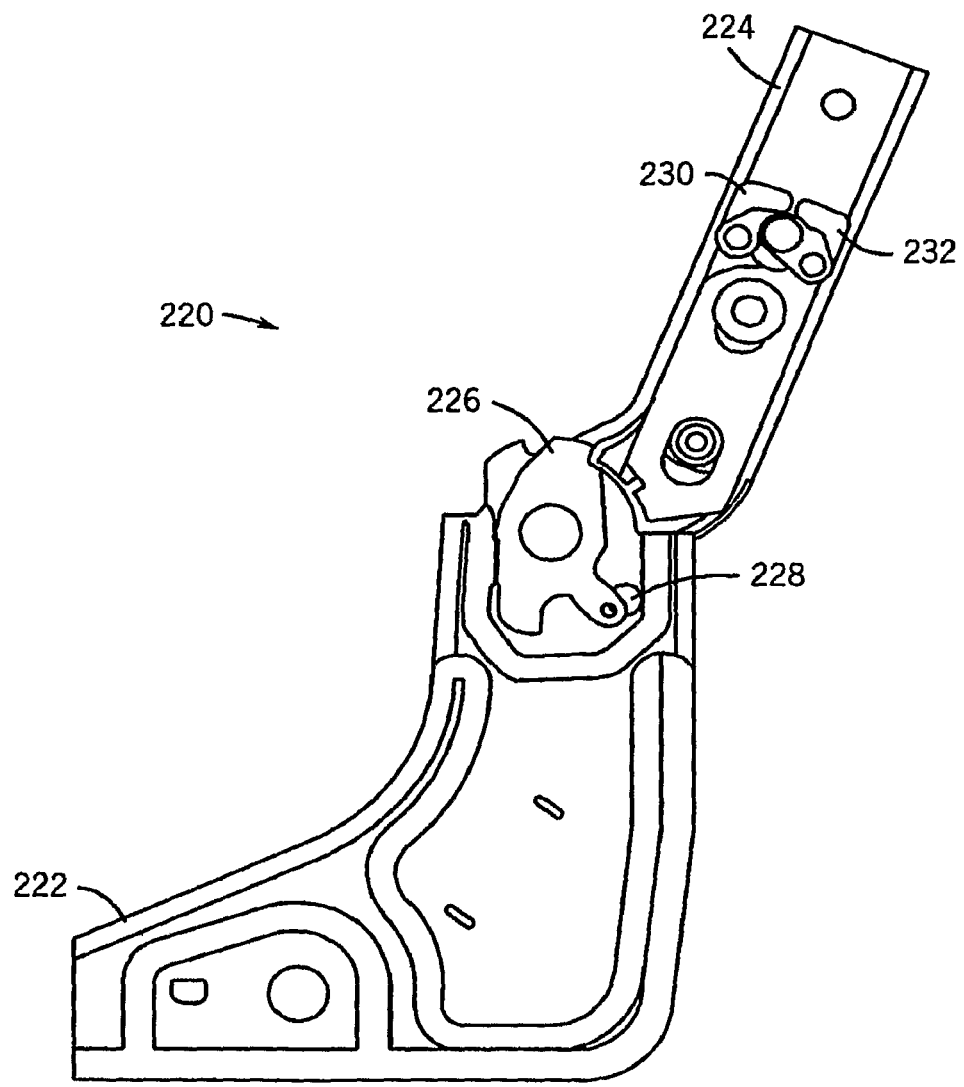
FIG. 10 is a side view of the change of position mechanism of FIG. 1 in a design position according to a second exemplary embodiment.

Referring to FIG. 10, a design position of change of position mechanism 220 is shown. Lower bracket 222 is typically coupled to seat base 12 using pins or bolts for support of change of position mechanism 220 and seat back 14. Upper bracket 224 is typically coupled to seat back 14 using pins or bolts so that it may support seat back 14 and the weight of a seat occupant. A track release lever or cam 226 is coupled to lower bracket 222 and is configured to rotate. A stop pin 228 and first and second levers 230 and 232 interact with track release lever 226 to facilitate movement of seat back 14 to various positions. It is noted that in other exemplary embodiments, each portion of change of position mechanism 220 may be coupled to each other, as appropriate, by any means such as welding or by one or more fasteners, for example bolts, pins, or screws.

Figure 11:
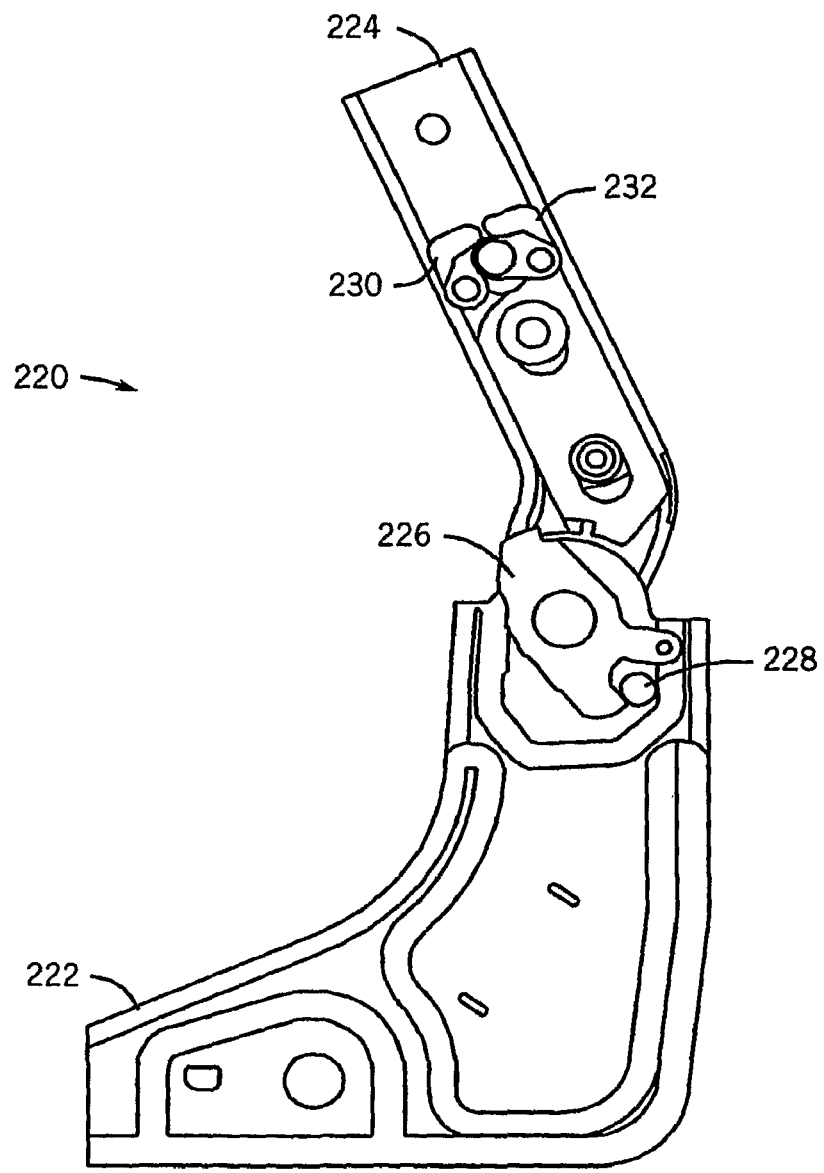
FIG. 11 is a side view of the change of position mechanism of FIG. 1 in an easy entry position according to the second exemplary embodiment.

Referring to FIG. 11, to move change of position mechanism 220 to the easy entry position from the design position, an occupant need only push seat back 14 forward. Since first lever 230 is not lifted, it makes contact with and rotates track release lever 226 until it abuts against stop pin 228, at which point change of position mechanism 220 is in the easy entry position. Change of position mechanism 220 cannot be moved to a stow position from this point since the retracted first and second levers 230 and 232 and stop pin 228 prevent any further forward movement of seat back 14. Track release lever 226 is coupled to track 16 by cable 18 and thus while in the easy entry position, seat 10 may be moved forward on track 16 for easier access to the area behind seat 10. In order to return to the design position, the occupant need only push the seat backwards to the design position. Actuators may be coupled to the seatback 19 and seat base 12 to facilitate the movement described above.

Figure 12:
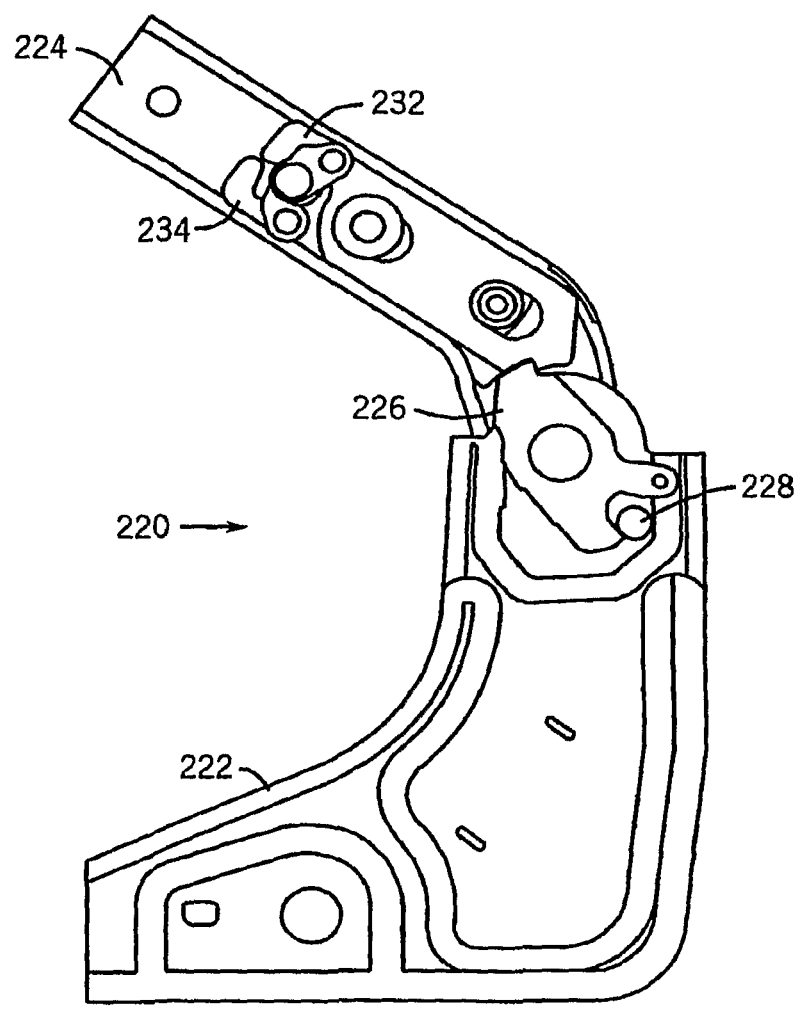
FIG. 12 is a side view of the change of position mechanism of FIG. 1 in an intermediate stow position according to the second exemplary embodiment.

Referring to FIG. 12, the placement of change of position mechanism 220 to an intermediate stow position is shown. This position allows for greater access to an area behind seat 10 that in the easy entry position without the need of placing change of position mechanism 220 in the stow position. In order to place change of position mechanism 220 into this position, an occupant pushes seat back 14 forward while lifting first lever 230. Lifting first lever 230 allows for seat back 14 to be moved further forward until second lever 232 makes contact with track release lever 226, which abuts against stop pin 228. In a preferred exemplary embodiment seatback 14 may stow to an angle of 76 degrees from the design position. In other exemplary embodiments, seatback 14 may stow to any position between the design position and stow position. In order to return to the design position, the occupant need only push seat backwards to the design position as the shape of track release lever 226 allows for first lever 226 to slide over it.

Figure 13:
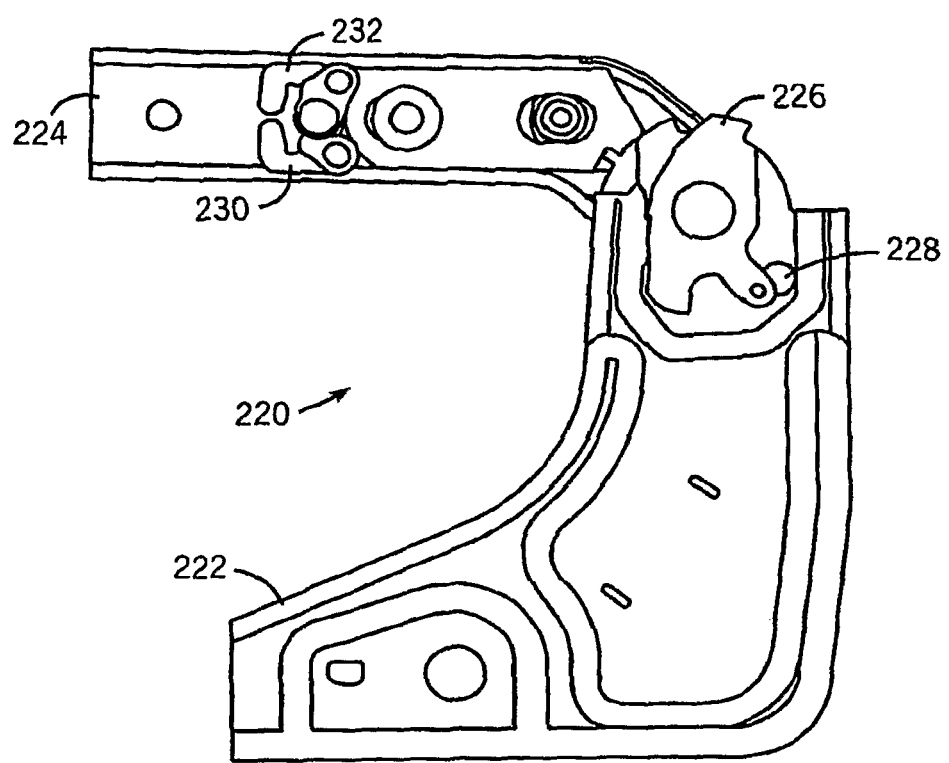
FIG. 13 is a side view of the change of position mechanism of FIG. 1 in a stow position according to the second exemplary embodiment.

Referring to FIG. 13, the placement of change of position mechanism 220 to a stow position is shown. In order to place change of position mechanism 220 into this position, an occupant pushes seat back 14 forward while lifting first lever 230 as for the intermediate stow position. Then the occupant lifts second lever 232 to rotate seatback 14 to the stow position. Lifting second lever 232 allows for seat back 14 to be moved further forward until seatback 14 makes contact with cushioned seat 11. In order to return to the design position, the occupant need only push seat backwards to the design position as the curved shape of track release lever 226 allows for first and second levers 230 and 232 to slide over it.

In various exemplary embodiments, first and second levers 230 and 232 are typically coupled to a cable or lever that may be pulled or operated manually by an occupant or first and second levers 230 and 232 may be manipulated automatically through the use of actuators coupled to electronic controls.

Referring to FIG. 14-18, the movement of a change of position mechanism 320 between design, easy entry, partial stow, and stow positions according to a third exemplary embodiment is shown. The function of the third exemplary embodiment is similar to that of the first and second exemplary embodiments, with different parts to accomplish these functions.

Figure 14:
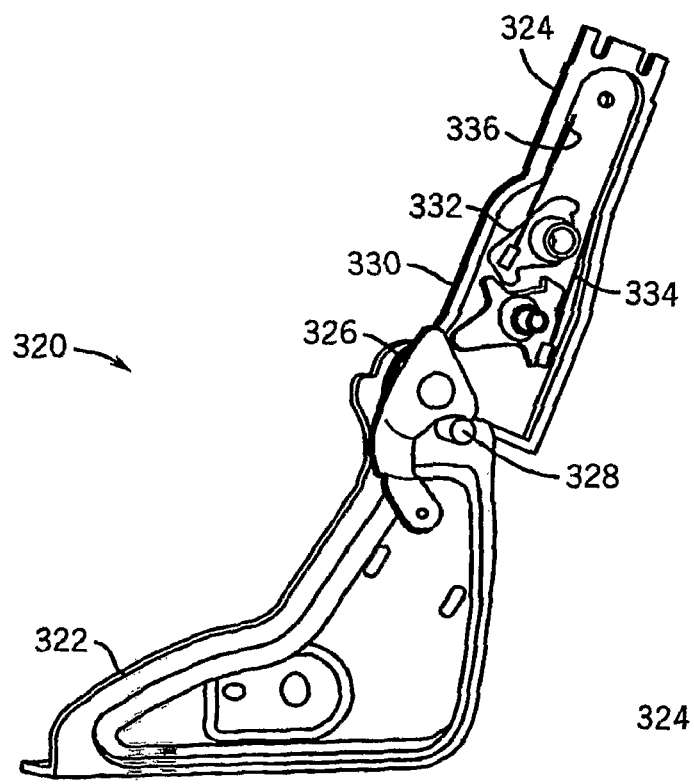
FIG. 14 is a side view of the change of position mechanism of FIG. 1 in a design position according to a third exemplary embodiment.

Referring to FIG. 14, a design position of change of position mechanism 320 is shown. Lower bracket 322 is typically coupled to seat base 12 using pins or bolts for support of change of position mechanism 320 and seat back 14. Upper bracket 324 is typically coupled to seat back 14 using pins or bolts so that it may support seat back 14 and the weight of a seat occupant. A track release lever 326 is coupled to lower bracket 322 and is configured to rotate. A stop pin 328 interacts with track release lever 326 to facilitate movement of seat back 14 to various positions. A cam or pawl 330 and a lock lever 332 are coupled to upper bracket 324 where they rotate and interact with track release lever 326 to further facilitate movement of seat back 14 to various positions. Cam 330 and lock lever 332 are rotated when a coupled stow cable 334 or lock cable 336, respectively, are pulled by an occupant. It is noted that in other exemplary embodiments, each portion of change of position mechanism 320 may be coupled to each other, as appropriate, by any means such as welding or by one or more fasteners, for example bolts, pins, or screws.

Figure 15:
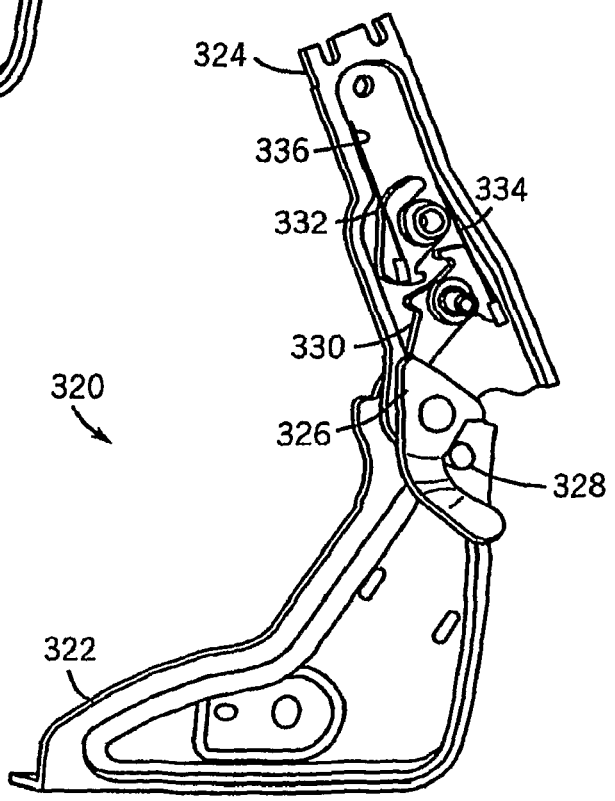
FIG. 15 is a side view of the change of position mechanism of FIG. 1 in an easy entry position according to the third exemplary embodiment.

Referring to FIG. 15, to move change of position mechanism 320 to the easy entry position from the design position, an occupant need only push seat back 14 forward. Since stow cable 334 is not pulled, cam 330 makes contact with track release lever 326, which rotates and the extended portion of which abuts against stop pin 328. Change of position mechanism 320 cannot be moved to a stow position from this point since the flat surface of cam 330 does not allow for rotation when abutted against track release lever 326. Track release lever 326 is coupled to track 16 by cable 18, which is pulled when in the easy entry position allowing seat 10 to be moved forward on track 16 for easier access to the area behind seat 10. In order to return to the design position, the occupant need only push the seat backwards to the design position.

Figure 16:
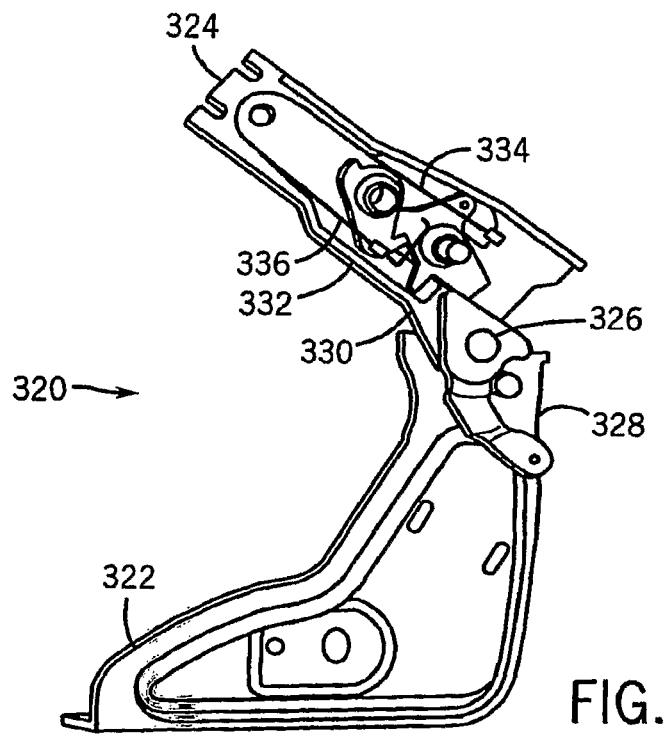
FIG. 16 is a side view of the change of position mechanism of FIG. 1 in an intermediate stow position according to the third exemplary embodiment.

Referring to FIG. 16, the placement of change of position mechanism 320 to an intermediate stow position is shown. This position allows for greater access to an area behind seat 10 that in the easy entry position without the need of placing change of position mechanism 320 in the stow position. In order to place change of position mechanism 320 into this position, an occupant pushes seat back 14 forward while pulling stow cable 334. Pulling stow cable 334 allows for seat back 14 to be moved further forward until cam 330 makes contact with lock lever 332. In a preferred exemplary embodiment seatback 14 may stow to an angle of 76 degrees from the design position. In other exemplary embodiments, seatback 14 may stow to any position between the design position and stow position. In order to return to the design position, the occupant need only push seat backwards to the design position as the cam 330 will simply rotate away from track release lever 326.

Figure 17:
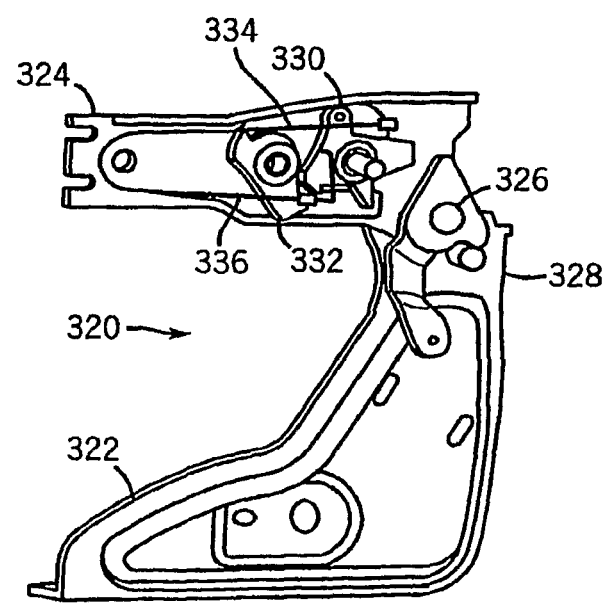
FIG. 17 is a side view of the change of position mechanism of FIG. 1 in a stow position according to the third exemplary embodiment.

Referring to FIG. 17, the placement of change of position mechanism 320 to a stow position is shown. In order to place change of position mechanism 320 into this position, an occupant pushes seat back 14 forward while pulling stow cable 334 as for the intermediate stow position. Then the occupant pulls lock cable 336 to rotate seatback 14 to the stow position. Pulling lock cable 336 allows for seat back 14 to be moved further forward until seatback 14 makes contact with cushioned seat 11. In order to return to the design position, the occupant need only push seat backwards to the design position as the curved shape of track release lever 326 allows for cam 330 to slide over it.

In various exemplary embodiments, lock and stow cables 334 and 336 may be pulled or operated manually by an occupant or may be manipulated automatically through the use of electronic controls.

Figure 18:
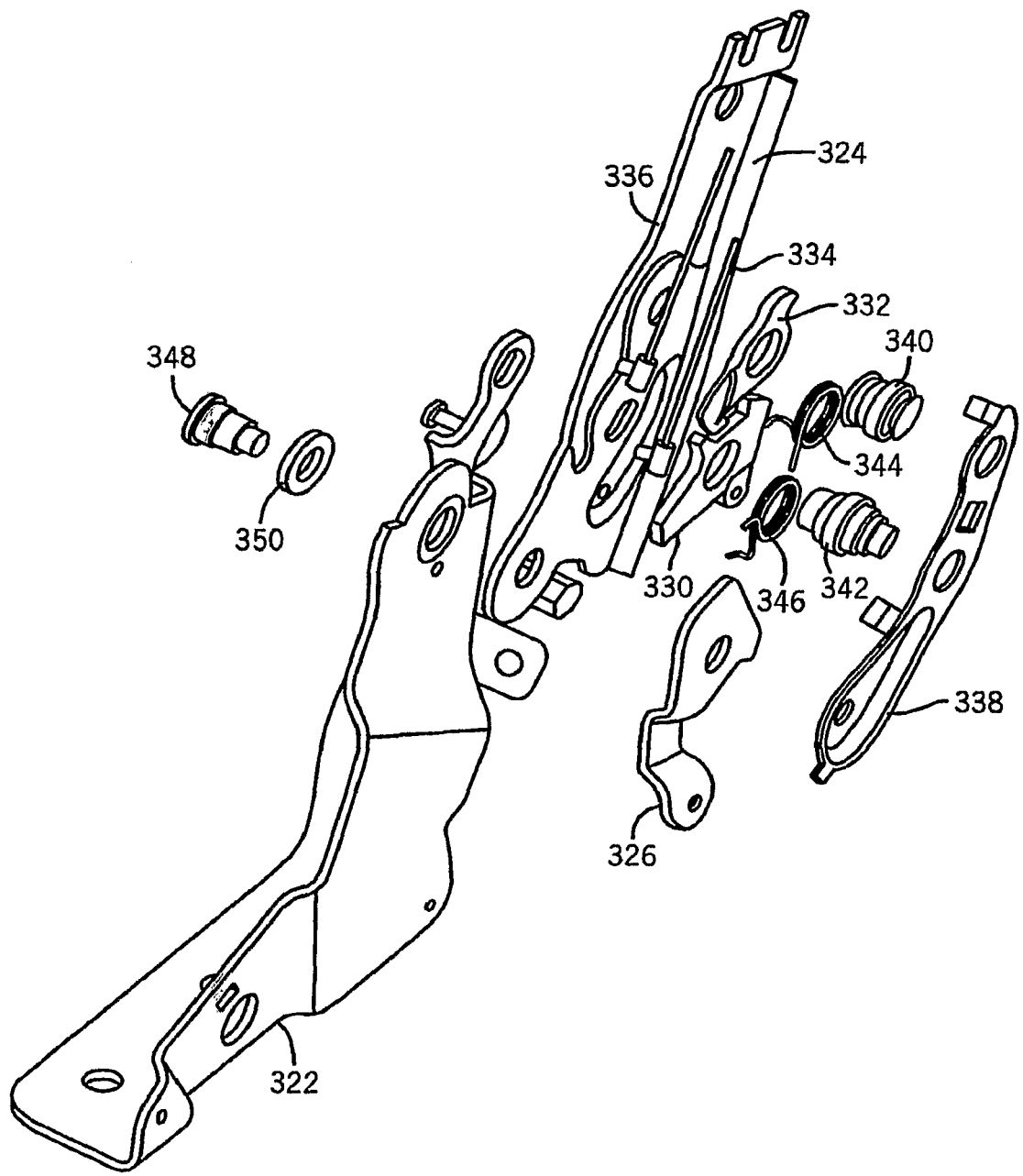
FIG. 18 is an exploded view of the change of position mechanism of FIG. 1 according to the third exemplary embodiment.

Referring to FIG. 18, an exploded view of the change of position mechanism 320 shows greater details of construction. A plate reinforcement 338 is coupled to and rotates with each of track release lever 326, cam 330, and lock lever 332 via bushing 340 and stow pivot 342 and provides greater structural integrity to change of position mechanism 320.

Lock lever 332 and cam 330 each are coupled to a spring 344 and 346, respectively, that biases lock lever 332 and cam 330 downwards so that when the lock and stow cables 336 and 334 are released, lock lever 332 and cam 330 return to their original positions (unless abutted against cam 330 or track release lever 326, respectively). Cam 330 and upper bracket are coupled to lower bracket 322 via a rotatable pin 348 and a bushing 350.

Figure 19:
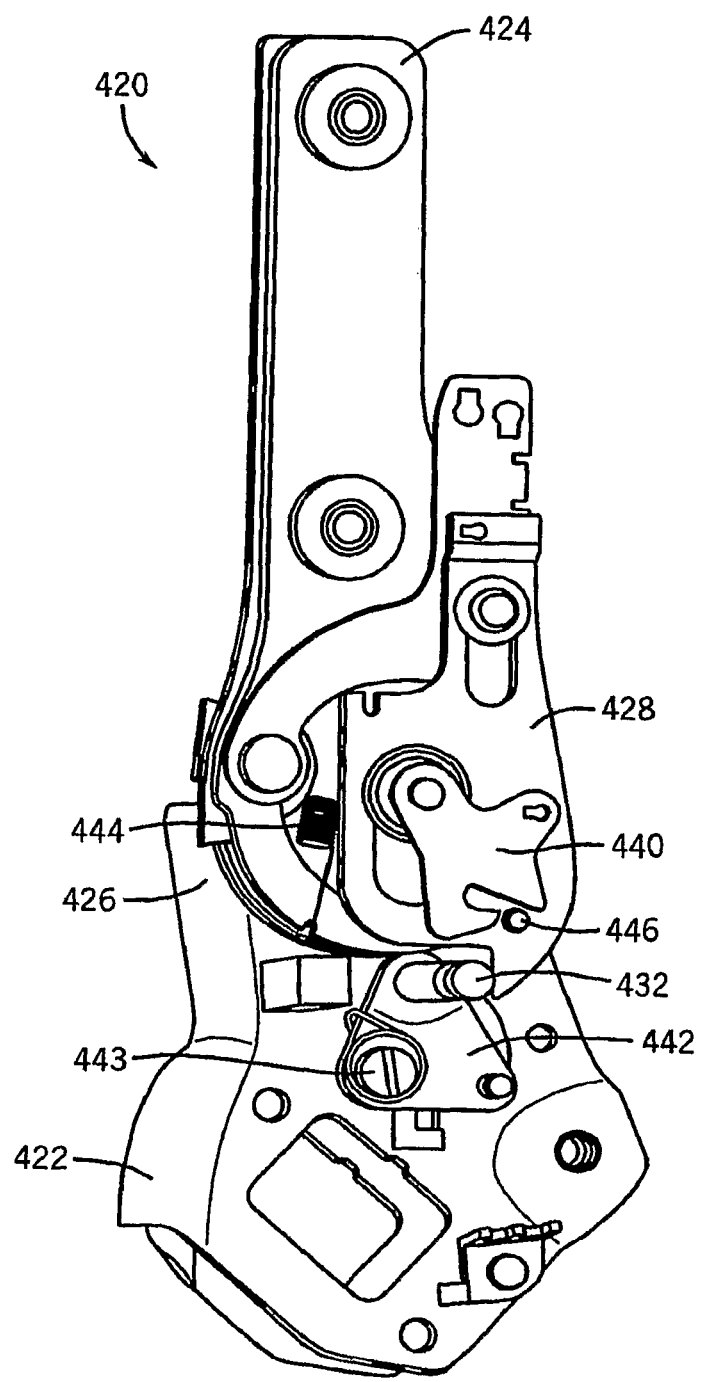
FIG. 19 is a rear perspective view of the change of position mechanism of FIG. 2 in a design position according to another exemplary embodiment.

Referring to FIG. 19, change of position mechanism 420, another exemplary embodiment of change of position mechanism 120 of FIG. 2, is shown. Change of position mechanism 420 has many similar parts as change of position mechanism 120 including a lower bracket 422, an upper bracket 424, a recliner mechanism 426, a latch plate 428, a pin stow lock or stop pin 432, a hand lever 440, a track release lever 442, a pivot pin 443, and a spring 444. Pawl 130 and pawl pin 134 have been omitted with the inclusion of a pin 446, coupled to latch plate 428, to work with hand lever 440, which is of a different shape than hand lever 140.

Lower bracket 422 is typically coupled to seat base 12 using pins or bolts for support of change of position mechanism 420 and seat back 14. Upper bracket 424 is typically coupled to seat back 14 using pins or bolts so that it may support seat back 14 and the weight of a seat occupant. Recliner mechanism 426 is preferably welded to lower bracket 422 on one side and upper bracket 424 on the other side and rotates to facilitates the movement of seat back 14. Latch plate 428, pin stow lock 432, and pin 446 work with recliner mechanism 426 to facilitate moving seat 10 into alternate positions and locking seat 10 in those positions.

When an occupant of seat 10 pulls the latch plate cable upwards while change of position mechanism 420 is in a design position, recliner mechanism 426 is unlocked and change of position mechanism 420 is able to move into a stow position. The stow position typically allows for an increase in cargo space. When an occupant of seat 10 pulls an easy entry cable upwards when change of control mechanism 420 is in a design position, recliner mechanism 426 is unlocked and change of position mechanism 420 is able to move into an easy entry position. When in this position, latch plate 428 presses against track release lever 442 allowing movement of seat 10 along track 16. The movement of seat back 14 and seat 10 along track 16 in the easy entry position typically allows for easier access to the area behind seat 10, for example for additional cargo space or easier access to additional seating. It is noted that in other exemplary embodiments, each portion of change of position mechanism 420 may be coupled to each other, as appropriate, by any means such as welding or by one or more fasteners, for example bolts, pins, or screws.

Figure 20:
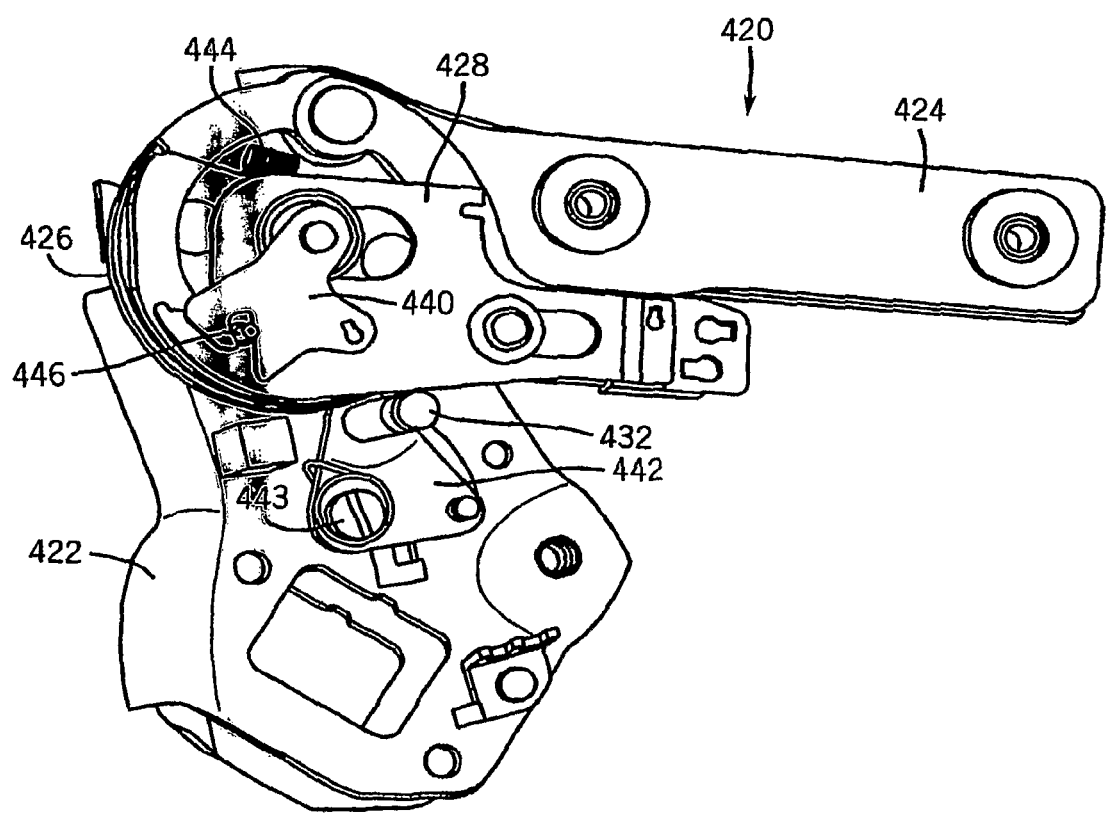
FIG. 20 is a side view of the change of position mechanism of FIG. 6 in a stow position according to another exemplary embodiment.

Referring to FIG. 20, to move change of position mechanism 420 into a stow position, an occupant pulls a latch plate cable as with the embodiment of FIG. 4-6. It is noted that in various exemplary embodiments, the occupant may manually pull the latch plate cable or another coupled part (for example a lever) or may press a button coupled to an actuator, for example, an electric device, that causes the latch plate cable to be pulled. The force exerted on latch plate 428 by the latch plate cable causes latch plate 428 to be pulled (extending spring 444), which causes operation or pulling forward of hand lever 440. When hand lever 440 is operated, recliner mechanism 426 is released and the recliner is now free to go in a stow position when recliner mechanism 426 rotates in a forward direction.

As the stow angle decreases with the rotation of recliner mechanism 426, latch plate 428 is pulled up by an occupant such as via a cable. This causes latch plate 428 to not catch on pin stow lock 432. Pin 446 moves into a groove defined by hand lever 440 to keep latch plate 428 in the pulled or upwards position so seat 10 does not go into the easy entry position.

With seat 10 in the stow position, latch plate 428 slides over pin stow lock 432 a predetermined distance.

The stow flat mechanism has completed its function and seat 10 is arrested in the stow position, preferably at 104 degrees from the design position. In other exemplary embodiments, the stow position may arrest seat 10 at an angle of greater than or less than 104 degrees from the design position as long as the position allows for increased cargo space. Seat 10 may be placed back to the design position by pulling on a latch plate cable and rotating seat back 14 in a backwards direction. When change of direction mechanism 420 reaches the design position, hand lever 440 returns back to the design position which releases pin 446 and plate 428 is returned to the design position by the bias of spring 444.

Figure 21:
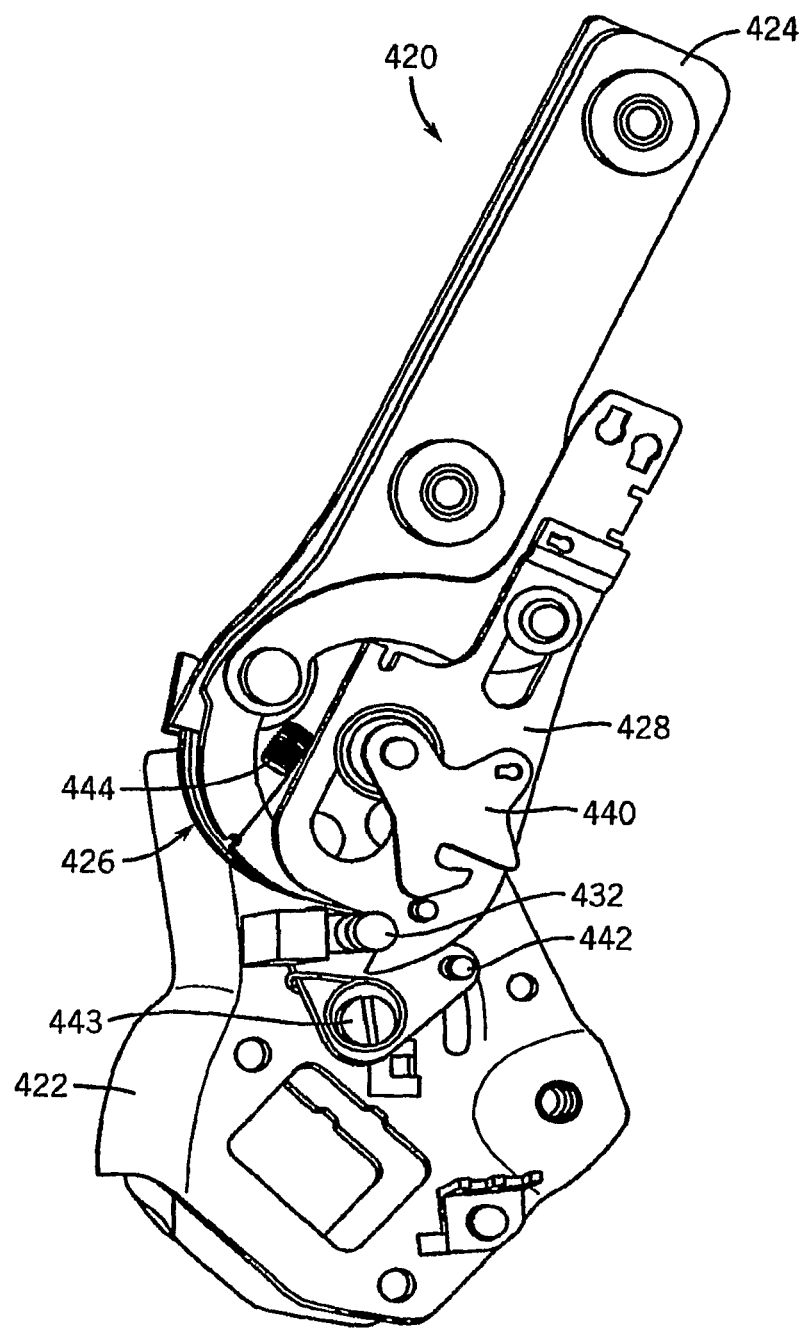
FIG. 21 is a front perspective view of the change of position mechanism of FIG. 8 in an easy entry position according to another exemplary embodiment.

Referring to FIG. 21, to move change of position mechanism 420 into an easy entry position, an occupant pulls an easy entry cable as in the exemplary embodiment of FIGS. 7 and 8. The easy entry mechanism is the collection of parts of change in position mechanism 420 that is used to set seat 10 into the easy entry position. An occupant pulls an easy entry cable, for example one similar to easy entry cable 138. In various exemplary embodiments, the occupant may manually pull the easy entry cable or another coupled part (for example a lever) or may press a button coupled to an actuator, for example, an electric device, that causes the easy entry cable to be pulled.

The force exerted by a pulled easy entry cable pulls hand lever 440 in an upward direction. Hand lever 440 acts as a cam rotating around and making contact with pin 446 to prevent latch plate 428 from being pulled up by a latch plate cable and seat 10 from moving into a stow position. Recliner mechanism 426 is released and rotates in a forward direction, also moving seat back 14 forward. Latch plate is pushed against pin stow lock 432 arresting the motion of seat back 14.

When seat back 14 is actuated to the easy entry position, latch plate 428, which is coupled to recliner mechanism and rotates with it, presses against and operates track release lever 442. Track release lever 442 rotates on a pivot pin 443 and pulls a track release cable, unlocking seat 10 from its position on track 16. Seat 10 operates on track 16 allowing for movement in a forward direction enabling the occupant to enter another row of seating in vehicle 5. Seat 10 may be placed back to the design position by pulling on the easy entry cable and rotating seat back 14 in a backwards direction. When change of direction mechanism 420 reaches the design position, hand lever 440 returns back to the design position as well.

It is noted that while the embodiments of FIG. 19-21 makes use of pin 446 to lock change of position mechanism into a stow or easy entry position, in other exemplary embodiments, a tab or other protrusion coupled to latch plate 428 could be used.

For purposes of this disclosure, the term "coupled" means adjoining of two components (electric or mechanical) directly or indirectly to one another. Such joining may be stationary in nature or movable in nature. Such joining may be achieved with the two components (electric or mechanical) and any additional intermediate members being integrally formed as a single unitary body with one another or with the two components or the two components and any additional member being attached to one another. Such joining may be permanent in nature or alternatively may be removable or releasable in nature.

It should be understood that when referring to a direction such as forward or rearward, reference is being made to the general direction of the vehicle movement in relation to the driver. Also reference to a row of seats typically is the first row being the row in which the driver sits with subsequent rows identified consecutively, for example second row and third row.

Although specific shapes of each element have been set forth in the drawings, each element may be of any other shape that facilitates the function to be performed by that element. For example, track release lever 326 is shown to have a specific curvilinear shape, however, in other embodiments track release lever 326 may have a different shape that accomplishes the same function of not allowing transition between stow and easy entry positions while always allowing transition to the design position.

Although change of position mechanisms 20, 120, 220, and 320 are illustrated as including multiple features utilized in conjunction with one another, each may alternatively utilize less than all of the noted mechanisms or features. For example, in other exemplary embodiments, plate reinforcement 338 may be omitted.

The present disclosure has been described with reference to example embodiments, however workers skilled in the art will recognize that changes may be made in form and detail without departing from the spirit and scope of the claims. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example is manifestly intended to be as broad as possible. For example, unless specifically otherwise noted a single particular element may also encompass a plurality of such particular elements.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. Other substitutions, modifications, changes and omissions may be made in the design, operating conditions and arrangement of the preferred and other exemplary embodiments without departing from the spirit of the present subject matter.

What is claimed is:

1. A vehicle seat for coupling to a vehicle, comprising:
   a seat back;
   a seat cushion;
   a recliner mechanism coupled to the seat back and the seat cushion, wherein the recliner mechanism is configured to adjust a position of the seat back with respect to the seat cushion;
   a stow mechanism coupled to the recliner mechanism, wherein the stow mechanism is configured to actuate the recliner mechanism so as to locate the vehicle seat in a stow position;
   an easy entry mechanism coupled to the recliner mechanism and to the stow mechanism; and
   a pin and a latch plate working with the recliner mechanism,
   wherein, when the stow mechanism is actuated to move the vehicle seat to the stow position by applying to the latch plate so as to move the latch plate into a pulled position, the easy entry mechanism is configured to be locked out and prevented from being actuated by the pin keeping the latch plate in the pulled position such that a user cannot actuate the easy entry mechanism when the vehicle seat is in the stow position, and
   wherein, when the easy entry mechanism is actuated to move the vehicle seat to an easy entry position, the pin is configured to prevent the latch plate from moving into the pulled position such that applying the force to the latch plate when the vehicle seat is in the easy entry position will not move the latch plate into the pulled position.

2. The vehicle seat of claim 1 further comprising a track release lever coupled to a track and a hand lever coupled to the track release lever for selectively operating the track release lever.

3. The vehicle seat of claim 1 wherein the vehicle seat is placeable into a design position in which the vehicle seat is intended to be occupied while the vehicle is being operated.

4. The vehicle seat of claim 3 wherein the stow position is a position in which the vehicle seat is located to increase a cargo storage capacity of the vehicle and the easy-entry position is a position in which the vehicle seat is moved from the design position to provide entry to an area behind the vehicle seat.

5. The vehicle seat of claim 1 including an interlock device having a cam and a stop pin coupled to the stow mechanism and the easy entry mechanism.

6. The vehicle seat of claim 1 further comprising a track release lever coupled to a track, wherein the track release lever pivots about a different axis from an axis of the recliner mechanism, and wherein the latch plate is configured to press against the track release lever allowing movement of the seat along the track when in the easy entry position.

7. A method of making a vehicle seat, wherein the vehicle seat includes a seat back and a seat base, the method comprising:
   coupling a recliner mechanism to the seat back and the seat base;
   coupling an easy entry mechanism to the seat base; and
   coupling a controller mechanism to the recliner mechanism and the easy entry mechanism, with the controller mechanism including a latch plate and a pin for selectively operating the recliner mechanism,
   wherein the seat back is movable about the recliner mechanism to a stow position by applying a force to the latch plate so as to move the latch plate into a pulled position when the easy entry mechanism is locked by the controller mechanism by the pin keeping the latch plate in the pulled position such that a user cannot actuate the easy entry mechanism when the vehicle seat is in the stow position, and
   wherein the seat back is movable about the recliner mechanism to an easy entry position when the pin prevents the latch plate from moving into the pulled position such that applying the force to the latch plate when the vehicle seat is in the easy entry position will not move the latch plate into the pulled position.

8. The method of claim 7 including the step of configuring the seat back to move at least 104° from a design position to the stow position.

9. The method of claim 7 including the step of configuring the seat back to move from the stowed position to a design position.

10. The method of claim 7 wherein a track release lever is coupled to a track so as to pivot about a different axis from an axis of the recliner mechanism, wherein the latch plate is configured to press against the track release lever allowing movement of the seat along the track when in the easy entry position.

\* \* \* \* \*